Patented June 2, 1931

1,808,730

UNITED STATES PATENT OFFICE

CARL BÖHM VON BÖRNEGG, OF FRANKFORT-ON-THE-MAIN, GERMANY

METHOD FOR MAKING A STABLE POWDER FROM WHOLE MILK

No Drawing. Application filed August 13, 1927, Serial No. 212,848, and in Germany May 6, 1926.

This invention relates to a method for making a stable powder from whole milk.

It is known that a powder made from skimmed milk is stable for an unlimited time, that however a powder made from whole milk is very sensitive to the noxious influences of the air and therefore not very stable, so that it may be kept only for a short time. Whole milk powders have therefore to be packed very carefully and may be shipped to tropical countries only, when the goods are handled with special precautions. The susceptibility of whole milk powders depends upon their content of butter fat.

The surprising discovery has now been made that a milk preparation with a higher content of butter fat, such as cream, dried according to any one of the known methods, for example by atomizing the cream in a heated atmosphere, is just as stable as dried skimmed milk. This result probably depends upon the fact, that during the desiccation of the cream a kind of a sintering of the butter fat takes place, by which the surface of the fat is diminished with respect to the structure of the other solid constituents of the cream and by which the butter fat is uniformly distributed over the other solid constituents of the cream, where it is exposed to the influence of air and the like.

According to the invention stable powders of whole milk are prepared by skimming the whole milk, drying the cream and the skimmed milk separately and mixing the powders obtained according to the natural constitution of the whole milk. This mixture may however also be obtained by a simultaneous atomization in a heated atmosphere of the cream and skimmed milk obtained from whole milk. In this case two separate atomizers or similar devices which are simultaneously working in the same heated atmosphere, are used for the separate atomizatiton of the cream and the skimmed milk.

One may for example run the prepared whole milk through a milk centrifuge and lead the obtained skimmed milk and cream to two separate atomizers working in the same heated atmosphere. The feeding of the atomizers is regulated in such a manner, that the obtained mixture of the powders corresponds to the natural composition of the whole milk.

The separate evaporation of the skimmed milk and cream obtained from whole milk may also be carried through by atomizing the skimmed milk at the upper surface of an atomizing disk and by leading the cream to the lower surface of the atomizing disk by a conduit as for example described in the German patent No. 374,288.

It has already been proposed to make liquid compositions similar to milk by emulsifying butter in a solution made from skimmed milk. From this method the invention differs by the fact, that butter fat is not added to the solution as solid butter or pure butter fat but as a dry powder containing other solid substances of the milk mechanically combined with butter fat.

The invention is not limited to the special examples given for drying the skimmed milk and the cream. Any other suitable drying method is also adapted for the purpose in question. Thus for example one may desiccate the cream by atomization and the skimmed milk upon a vacuum drum and mix the obtained powders later.

I claim:

A method for making stable whole milk powders which consists in skimming whole milk, desiccating the cream and the skimmed milk by separate atomizers in the same atmosphere and regulating the feeding of the cream and the skimmed milk in such a manner that a mixture of the desiccated cream powder and the desiccated skimmed milk powder is obtained, which corresponds to the natural composition of the whole milk.

In testimony whereof I affix my signature.

CARL BÖHM v. BÖRNEGG.